(12) United States Patent
Kitamura et al.

(10) Patent No.: US 11,068,039 B2
(45) Date of Patent: Jul. 20, 2021

(54) ELECTRONIC APPARATUS, CONTROL METHOD, AND STORAGE MEDIUM

(71) Applicant: CASIO COMPUTER CO., LTD., Tokyo (JP)

(72) Inventors: Shigeki Kitamura, Tokyo (JP); Tsuyoshi Minami, Tokyo (JP); Takashi Suenaga, Tokyo (JP); Munetaka Seo, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 112 days.

(21) Appl. No.: 16/444,374

(22) Filed: Jun. 18, 2019

(65) Prior Publication Data

US 2019/0391631 A1 Dec. 26, 2019

(30) Foreign Application Priority Data

Jun. 20, 2018 (JP) .............................. JP2018-117374

(51) Int. Cl.
| | |
|---|---|
| *G06F 1/00* | (2006.01) |
| *G06F 1/3231* | (2019.01) |
| *G06F 1/16* | (2006.01) |
| *G06F 1/3215* | (2019.01) |

(52) U.S. Cl.
CPC ............ *G06F 1/3231* (2013.01); *G06F 1/163* (2013.01); *G06F 1/1694* (2013.01); *G06F 1/3215* (2013.01)

(58) Field of Classification Search
CPC ...... G06F 1/163; G06F 1/1694; G06F 1/3215; G06F 1/3231; G06F 1/1684; G06F 1/3262; G06F 1/3265; G06F 1/3287
See application file for complete search history.

(56) References Cited

U.S. PATENT DOCUMENTS

| | | | | |
|---|---|---|---|---|
| 2014/0132565 A1* | 5/2014 | Lin | ....................... | G06F 3/0425 345/175 |
| 2014/0233356 A1* | 8/2014 | Pattikonda | ........... | G04G 9/0064 368/13 |
| 2015/0123929 A1* | 5/2015 | Bang | ..................... | G06F 3/0488 345/173 |
| 2016/0188142 A1* | 6/2016 | Oh | ........................ | G06F 3/045 345/174 |
| 2017/0364763 A1* | 12/2017 | Jin | ......................... | G06F 21/32 |
| 2018/0024661 A1* | 1/2018 | Lin | ......................... | G09G 5/00 345/173 |

FOREIGN PATENT DOCUMENTS

| | | |
|---|---|---|
| JP | 2010-257012 A | 11/2010 |
| JP | 2014-016776 A | 1/2014 |
| WO | 2013/021846 A1 | 2/2013 |

* cited by examiner

*Primary Examiner* — Zhipeng Wang

(74) *Attorney, Agent, or Firm* — Fitch, Even, Tabin & Flannery LLP

(57) ABSTRACT

An electronic apparatus provided with a touch screen, the electronic apparatus comprising: a first sensor that detects approach of a finger to the touch screen; and a controller that switches, in an inactive state of the touch screen, in a case where the first sensor detects the approach of the finger to the touch screen, an operating state of the touch screen from the inactive state to an active state.

11 Claims, 5 Drawing Sheets

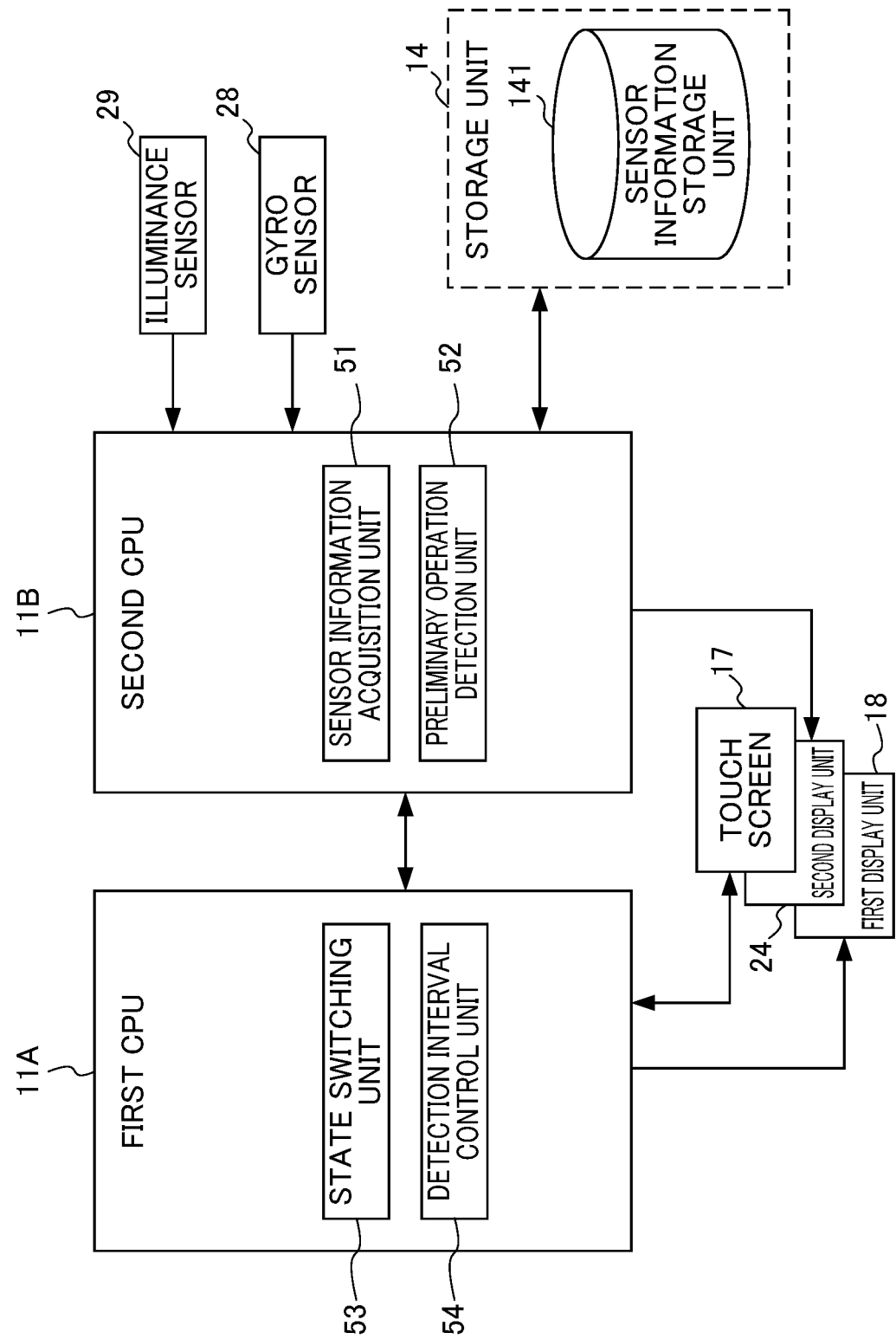

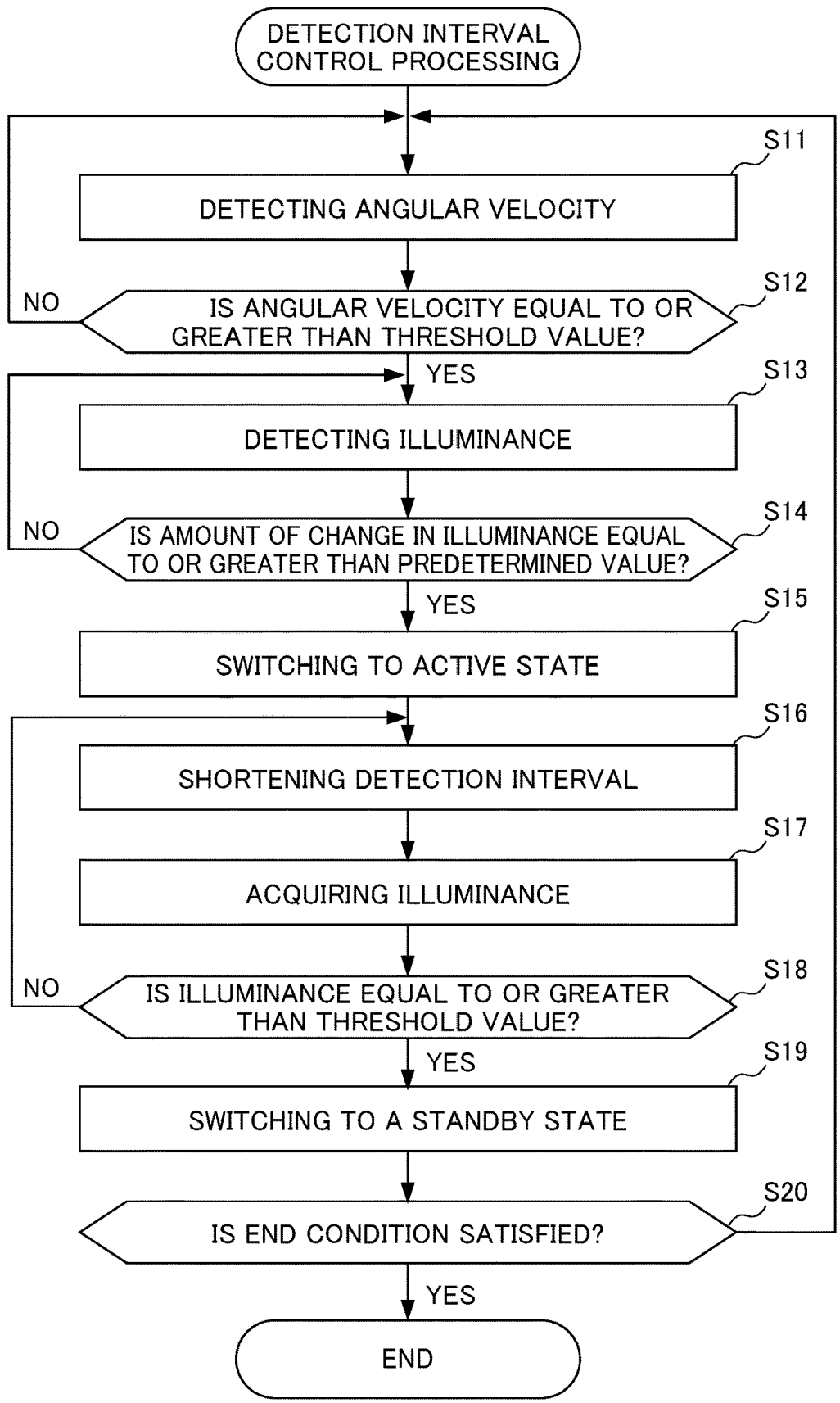

ELECTRONIC APPARATUS, CONTROL METHOD, AND STORAGE MEDIUM

CROSS-REFERENCE TO RELATED APPLICATIONS

This application is based upon and claims the benefit of priority under 35 USC 119 of Japanese Patent Application No. 2018-117374 filed on Jun. 20, 2018, the entire disclosure of which, including the description, claims, drawings, and abstract, is incorporated herein by reference in its entirety.

BACKGROUND OF THE INVENTION

An embodiment relates to an electronic apparatus, a control method, and a storage medium.

In recent years, electronic apparatuses, such as smartphones, are provided with touch screens that detect touch operations performed by users in an active state. These electronic apparatuses transition to a so-called inactive state when the user is not performing touch operations, thereby reducing power consumption. In the inactive state, the touch screen returns to the active state after detecting a predetermined operation. When the electronic apparatus returns to the active state, the electronic apparatus starts an operation corresponding to the operation on the touch screen (for example, see Japanese Unexamined Patent Application Publication No. 2014-16776).

However, in the general techniques such as those disclosed in Japanese Unexamined Patent Application Publication No. 2014-16776, etc., in order to return the touch screen to the active state, it is necessary for the user to perform a predetermined operation on an operation unit other than the touch screen. Therefore, it takes a certain time from when the user tries to operate the touch screen until the touch screen actually detects the touch operation by the user.

SUMMARY OF THE INVENTION

Preferred embodiment of the electronic apparatus provided with a touch screen comprising:
a first detector that detects approach of a finger to the touch screen; and
a controller that switches, in an inactive state of the touch screen, in a case where the first sensor detects the approach of the finger to the touch screen, an operating state of the touch screen from the inactive state to an active state.

BRIEF DESCRIPTION OF THE DRAWING

FIG. 4 is a functional block diagram illustrating a functional configuration for executing detection interval control processing among functional configurations of an electronic apparatus of FIG. 2.

FIG. 5 is a flowchart illustrating a flow of detection interval control processing executed by the electronic apparatus of FIG. 1 including the functional configuration of FIG. 4.

DETAILED DESCRIPTION OF THE PREFERRED EMBODIMENTS

Figure 1:
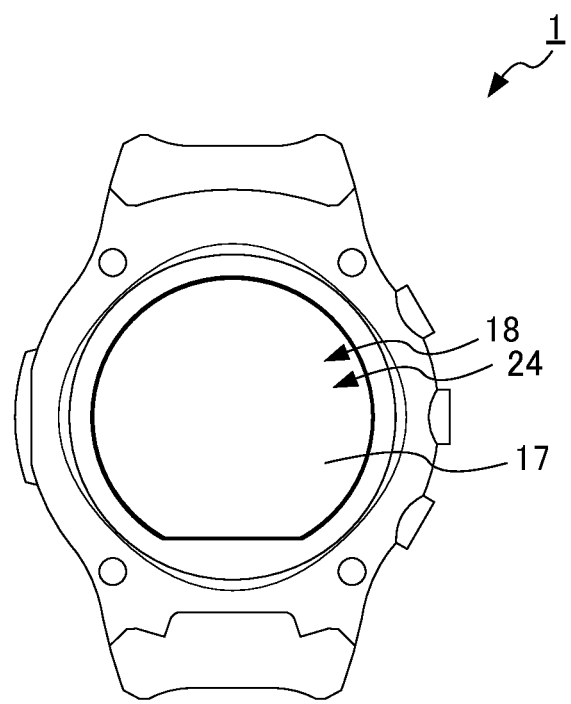
FIG. 1 is a schematic diagram of an electronic apparatus according to an example embodiment.

Hereinafter, preferred embodiments will be described with reference to the drawings.
[Configuration]
FIG. 1 is a schematic diagram of an electronic apparatus 1 according to a first embodiment. As illustrated in FIG. 1, the electronic apparatus 1 of the present embodiment is configured as a wristwatch-type device called a so-called smart watch. Further, the electronic apparatus 1 includes a first display unit 18 and a second display unit 24, and the second display unit 24 is stacked on the first display unit 18. Further, a touch screen 17, which will be described later, is provided on the second display unit 24. Therefore, the electronic apparatus 1 makes it possible to perform display by superimposing the display of the second display unit 24 on the display of the first display unit 18, and also makes it possible to perform a touch operation on displayed contents.

A change of display is also performed in accordance with a so-called tilt operation by the user. The electronic apparatus 1 normally displays displayed contents of the second display unit 24. When the tilt operation performed by the user is detected, the electronic apparatus 1 displays the displayed contents of the first display unit 18. As will be described in detail below, the second display unit 24 is a so-called segment liquid crystal, and makes it possible to perform, for example, a 7-segment clock display. In addition, the first display unit 18 provided under the second display unit 24 is a so-called organic EL display, and may serve as backlight for the 7-segment clock display. Alternatively, the electronic apparatus 1 may control the entire region of the segment liquid crystal of the second display unit 24 to be in a transmissive state, thereby allowing the organic EL display of the first display unit 18 to display advanced information such as received information of an electronic mail, map information, and the like. The user can perform a touch operation on the displayed contents such as the map information via the touch screen 17.

Figure 2:
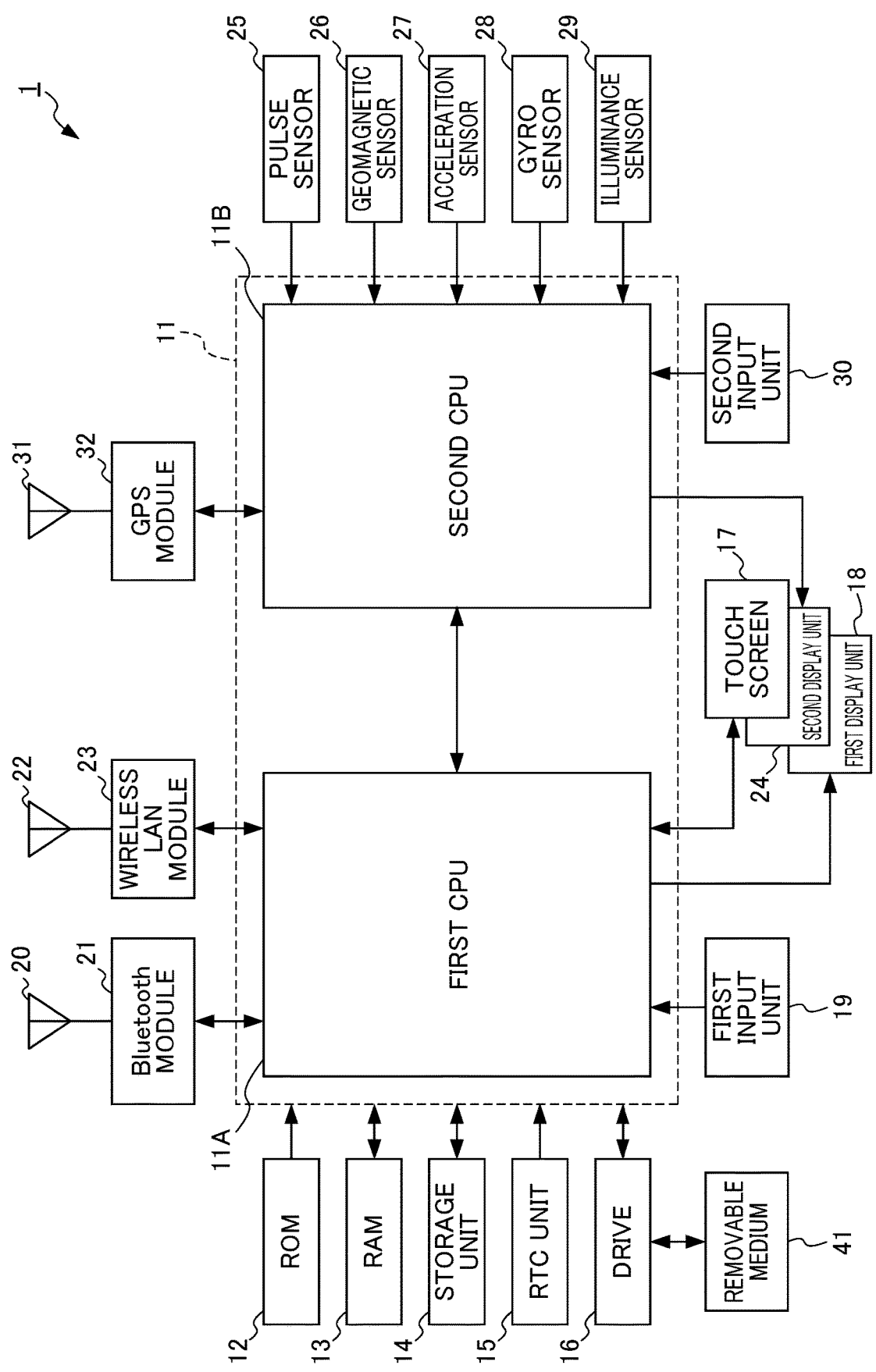
FIG. 2 is a block diagram illustrating a hardware configuration of a child device.

In one embodiment, the electronic apparatus 1 including the touch screen 17 detects an operation different from the touch operation on the touch screen 17. When detecting the operation different from the touch operation on the touch screen 17 in an inactive state of the touch screen 17, the electronic apparatus 1 switches the state of the touch screen 17 from the inactive state to an active state. It is to be noted that the operation different from the touch operation includes, for example, approach of a finger to a touch screen described in detail below, predetermined tilt operation, or the like. In this manner, the electronic apparatus 1 detects the operation different from the touch operation, thereby detecting the preliminary operation of the touch operation by the user and causing the touch screen 17 to return to the active state. This makes it possible to provide an electronic apparatus that does not require time to detect the touch operation.
[Hardware Configuration]
FIG. 2 is a block diagram illustrating a hardware configuration of the electronic apparatus 1. As illustrated in FIG. 2, the electronic apparatus 1 includes a CPU (Central Processing Unit) 11, a ROM (Read Only Memory) 12, a RAM (Random Access Memory) 13, a storage unit 14, an RTC (Real Time Clock) unit 15, a drive 16, the touch screen 17, the first display unit 18, a first input unit 19, a Bluetooth (registered trademark) antenna 20, a Bluetooth (registered trademark) module 21, a wireless LAN (Local Area Network) antenna 22, a wireless LAN module 23, the second display unit 24, a pulse sensor 25, a geomagnetic sensor 26, an acceleration sensor 27, a gyro sensor 28, an illuminance sensor 29, a second input unit 30, a GPS (Global Positioning System) antenna 31, and a GPS module 32.

The CPU 11 includes a first CPU 11A and a second CPU 11B. The first CPU 11A performs various arithmetic processing and executes processing of the operating system, thereby controlling functions in the electronic apparatus 1. These functions are similar to those of a smartphone. In the present embodiment, the first CPU 11A causes the first display unit 18 to display messages related to incoming e-mails and weather information received via the Bluetooth (registered trademark) module 21 or the wireless LAN module 23, and accepts an operation inputted via the touch screen 17. Further, the first CPU 11A recognizes speech that is inputted through the first input unit 19, and performs processing related to various functions implemented as functions similar to those of a smartphone. In the present embodiment, the first CPU 11A further acquires time signals from the RTC unit 15 at predetermined timing.

The second CPU 11B executes processing of a specific program to thereby instruct the second display unit 24 to perform display, acquire detection results from various sensors, and perform processing relating to various functions implemented as functions of a wristwatch. In the present embodiment, the second CPU 11B, for example, calculates the time of day and displays the time, the day of the week, the date, and the like on the second display unit 24, with the time signals inputted from the first CPU 11A as a reference. The processing of the specific program (calculation of the time of day, etc.) executed by the second CPU 11B is a relatively simple operation as compared with the processing of the OS executed by the first CPU 11A. Therefore, the processing load of the second CPU 11B is small and the processing is executable with lower power consumption. For this reason, the specifications of the hardware required for the second CPU 11B are lower than those of the hardware required for the first CPU 11A.

The ROM 12 is able to read data from the first CPU 11A and the second CPU 11B, respectively, and stores various programs executed by the first CPU 11A and the second CPU 11B, and initial setting data. For example, the ROM 12 stores an OS program executed by the first CPU 11A, various programs executed under the control of the OS, or a specific program executed by the second CPU 11B (here, a built-in program that realizes the functions of a wristwatch).

The RAM 13 is able to read and write data from the first CPU 11A and the second CPU 11B, respectively, and provides working memory space for the first CPU 11A and the second CPU 11B to store working temporary data. For example, the RAM 13 provides system area and work area when the OS is executed by the first CPU 11A, and provides storage area when a specific program is executed by the second CPU 11B.

The storage unit 14 is nonvolatile memory that is able to read and write data from the first CPU 11A and the second CPU 11B, respectively, and includes, for example, flash memory or EEPROM (Electrically Erasable and Programmable Read Only Memory). The storage unit 14 stores various data (data of various setting contents, etc.) generated by various functions similar to those of smartphones, the functions of a wristwatch, etc.

A removable medium 41 including, for example, semiconductor memory is appropriately mounted on the drive 16. The removable medium 41 is able to store various data such as data detected by various sensors. The touch screen 17 is, for example, a touch screen of a capacitance type or a resistive film type provided on a display screen of the second display unit 24. The touch screen 17 detects a touch operation position and an operation content that are operated by the user on the operation surface, and generates a signal corresponding to the operation, thereby outputting the resultant signal as an input signal to the first CPU 11A.

The first display unit 18 includes, for example, an organic electroluminescence (EL) display (Organic Light Emitting Diode), and displays various types of information on a display screen in accordance with control of the first CPU 11A. The first input unit 19 includes a microphone for converting sound into an electric signal, and outputs a signal indicating an inputted sound (e.g., a sound command for operation) to the first CPU 11A.

The Bluetooth antenna 20 is an antenna for transmitting and receiving electromagnetic waves based on the Bluetooth standard, and is configured by, for example, a monopole antenna or the like. The Bluetooth antenna 20 transmits, as an electromagnetic wave, an electric signal of wireless communication inputted from the Bluetooth module 21, and converts the received electromagnetic wave into an electric signal to output the resultant electric signal to the Bluetooth module 21. The Bluetooth module 21 transmits signals to another device via the Bluetooth antenna 20 in accordance with an instruction from the first CPU 11A. Further, the Bluetooth module 21 receives a signal transmitted from another device, and outputs information indicated by the received signal to the first CPU 11A.

The wireless LAN antenna 22 is an antenna that is able to receive radio waves of a frequency corresponding to wireless communication used by the wireless LAN module 23, and is configured by, for example, a loop antenna or a rod antenna. The wireless LAN antenna 22 transmits, as an electromagnetic wave, an electric signal of wireless communication inputted from the wireless LAN module 23, converts the received electromagnetic wave into an electric signal to thereby output the resultant electric signal to the wireless LAN module 23. The wireless LAN module 23 transmits signals to another device via the wireless LAN antenna 22 in accordance with an instruction from the first CPU 11A. The wireless LAN module 23 also receives a signal transmitted from another device and outputs the information indicated by the received signal to the first CPU 11A.

The GPS antenna 31 receives radio waves transmitted from satellites in the GPS, converts them into electrical signals, and outputs the converted electrical signals (hereinafter referred to as "GPS signals") to the GPS module 32. The GPS module 32 detects the position (latitude, longitude, altitude) of the electronic apparatus 1 and the current time indicated by the GPS on the basis of the GPS signal inputted from the GPS antenna 31. Further, the GPS module 32 outputs information indicating the detected position and the current time to the second CPU 11B.

The second display unit 24 includes a PN (Polymer Network) liquid crystal display that allows light to transmit partially or entirely, and displays various kinds of information on a display screen, for example, in a manner of segment display in accordance with to the control of the second CPU 11B. In the present embodiment, the PN liquid crystal display, which is the second display unit 24, is stacked on the display screen of the organic EL display, which is the first display unit 18, as illustrated in FIG. 3B. As for the PN liquid crystal display, in a portion where a potential is not applied, liquid crystal molecules are arranged irregularly, which allows light to be reflected. In other words, display by the PN liquid crystal display is performed at a portion where the potential is not applied. On the other hand, in a portion where the potential is applied, the liquid crystal molecules are arranged perpendicularly to the display screen, which allows the light to be transmitted. In other words, in the portion where the potential is applied, the light outputted from the organic EL display is allowed to be transmitted therethrough, which allows the display by the organic EL display to be visually recognized through the PN liquid crystal display. In other words, in the display area of the electronic apparatus 1, display is allowed to be performed in a state in which the display by the second display unit 24 is superimposed on the display by the first display unit 18.

The pulse sensor 25 is installed on the back face side (a side that faces the arm of a user) of the electronic apparatus 1, and detects the pulse of the user who wears the electronic apparatus 1. The geomagnetic sensor 26 detects the direction of the geomagnetism, and outputs information indicating the detected direction of the geomagnetism to the second CPU 11B. The acceleration sensor 27 detects acceleration in three axial directions in the electronic apparatus 1, and outputs information indicating the detected acceleration to the second CPU 11B. The gyro sensor 28 is included in a second detection unit, detects angular velocities in the three axial directions in the electronic apparatus 1, and outputs information indicating the detected angular velocities to the second CPU 11B. The information indicating the angular velocities outputted to the second CPU 11B is transmitted to the first CPU 11A. As will be described later, the first CPU 11A executes processing of adjusting a detection interval of the touch operation on the touch screen 17 on the basis of the information indicating the angular velocity (detection interval control processing to be described later). The illuminance sensor 29 is included in a first detection unit, installed at a predetermined location on the back face side of the first display unit 18, detects illuminance, for example, as brightness in the display area of the electronic apparatus 1, and outputs information indicating the detected illuminance to the second CPU 11B. As will be described later, the first CPU 11A executes processing of adjusting the brightness of the display screen of the first display unit 18 and processing of adjusting the detection interval of the touch operation on the touch screen 17 (detection interval control processing to be described later) on the basis of the brightness detected by the illuminance sensor 29. It is to be noted that, in a case where the second display unit 24 is in a non-transmissive state, a predetermined amount of incident light to the illuminance sensor 29 is partially blocked by the segment display; however, it is still possible for the illuminance sensor 29 to detect illuminance. The second input unit 30 includes various buttons, and inputs various types of information in accordance with an instruction operation by the user.

Figure 3A:
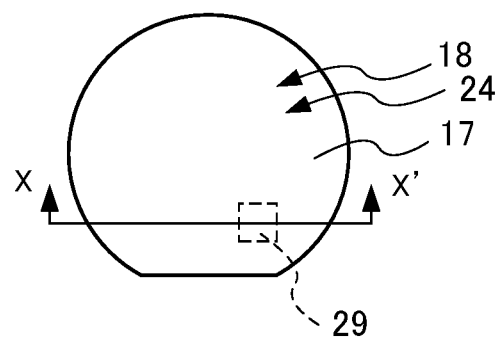
FIG. 3A is a schematic diagram illustrating an installation form of an illuminance sensor in a display area of the electronic apparatus.
Figure 3B:
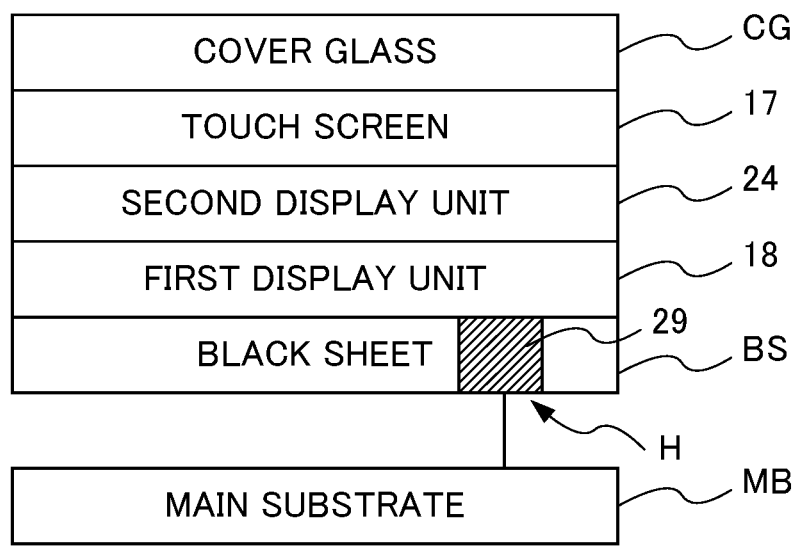
FIG. 3B is a schematic diagram illustrating a cross section taken along line X-X' in FIG. 3A.

FIG. 3A is a schematic diagram illustrating an installation form of the illuminance sensor 29 in the display area of the electronic apparatus 1. FIG. 3B is a schematic diagram illustrating a cross section taken along line X-X' in FIG. 3A. As illustrated in FIG. 3A, the illuminance sensor 29 is installed at a predetermined location in the display areas of the first display unit 18 and the second display unit 24. The predetermined location is, for example, a location at the lower right of the center denoted by a broken line in FIG. 3B.

As illustrated in FIG. 3B, the display area of the electronic apparatus 1 has a cross-sectional structure in which a cover glass CG, the touch screen 17, the second display unit 24, the first display unit 18, a black sheet BS, and a main substrate MB are stacked in this order from the front face side.

Among these, the black sheet BS is a member that adjusts color development when viewed through the second display unit 24 and the first display unit 18. In the present embodiment, black color is visually recognized. Further, a through hole H is formed in a part of the black sheet BS, and the illuminance sensor 29 is installed in the through hole H. Therefore, the illuminance sensor 29 has a structure in which light enters from the front face side of the display area of the electronic apparatus 1. This structure makes it possible to detect that, for example, the electronic apparatus 1 is placed under bright external light and thus the illuminance of the display area becomes high, and that the touch screen 17 of the electronic apparatus 1 is operated by a user and covered by the user's finger and thus the illuminance of the display area becomes low.

[Functional Configuration]

FIG. 4 is a functional block diagram illustrating a functional configuration for executing detection interval control processing among the functional configurations of the electronic apparatus 1 of FIG. 1. The detection interval control processing refers to a series of processing. For example, the series of processing includes processes in which a preliminary operation detection unit 52 detects a preliminary operation of a touch operation by a user on the basis of the amount of change (the amount of reduction) in illuminance acquired by a sensor information acquisition unit 51; a state switching unit 53 thereby switches the state of the touch screen 17; and a detection interval control unit 54 controls the detection interval of the touch screen 17.

In a case where the detection interval control processing is executed, as illustrated in FIG. 4, the sensor information acquisition unit 51, the preliminary operation detection unit 52, the state switching unit 53, and the detection interval control unit 54 function in the CPU 11.

The sensor information acquisition unit 51 acquires information detected by various sensors. For example, the sensor information acquisition unit 51 acquires illuminance as information relating to the detected brightness by the illuminance sensor 29. Alternatively, the sensor information acquisition unit 51 acquires the angular velocity detected by the gyro sensor 28.

The preliminary operation detection unit 52 detects the preliminary operation of the touch operation by the user in a case where a predetermined condition is satisfied. For example, the preliminary operation detection unit 52 detects the preliminary operation of the touch operation operated by the user on the basis of the illuminance and/or the angular velocity acquired by the sensor information acquisition unit 51.

The state switching unit 53 switches the state of the touch screen 17 in accordance with the detection of the preliminary operation by the preliminary operation detection unit 52. For example, when the preliminary operation detection unit 52 detects the preliminary operation in the inactive state, the state switching unit 53 switches the state of the touch screen 17 to the active state. The inactive state as referred to in the present embodiment is, for example, a state in which the detection interval of the touch screen 17 is longer than that of the touch screen 17 in the active state. Further, a standby state, which will be described later, is, for example, a state in which the touch screen 17 does not perform the detection of the contact of the user's finger. In other words, the inactive state as referred to in the present embodiment is a state that may include the standby state.

The detection interval control unit 54 adjusts the detection interval of the touch operation on the touch screen 17 in accordance with the switching of the state switching unit 53. The detection interval is, for example, an interval for detecting a contact of the user's finger with the touch screen 17. In a case where the detection interval is short, the touch screen 17 frequently detects the contact of the user's finger, allowing the user to comfortably operate the touch screen 17.

Further, a sensor information storage unit 141 is set in an area of the storage unit 14. The sensor information storage unit 141 stores information relating to the illuminance acquired by the illuminance sensor 29.

[Detection Interval Control Processing]

FIG. 5 is a flowchart illustrating a flow of detection interval control processing executed by the electronic apparatus 1 of FIG. 1 having the functional configuration of FIG. 4. The detection interval control processing is executed while the electronic apparatus 1 is powered on, for example. Further, in the present embodiment, the gyro sensor 28 is able to detect an angular velocity at any time, and the illuminance sensor 29 is able to detect the illuminance at any time.

In Step S11, the gyro sensor 28 detects an angular velocity. In a case where the gyro sensor 28 detects the angular velocity, the processing proceeds to Step S12.

In Step S12, the sensor information acquisition unit 51 acquires the detected angular velocity, and transmits information of the angular velocity to the preliminary operation detection unit 52. The preliminary operation detection unit 52 determines whether or not the angular velocity is equal to or greater than a threshold value. In a case where the angular velocity is less than the threshold value, the processing returns to Step S11. On the contrary, in a case where the angular velocity is equal to or greater than the threshold value, the processing proceeds to Step S13. For example, when the user performs a tilt operation to observe the display unit of the electronic apparatus 1, the angular velocity becomes equal to or higher than the threshold value. Therefore, in a case where the angular velocity is equal to or greater than the threshold value, the preliminary operation detection unit 52 estimates that the operation on the touch screen 17 is subsequently performed, and detects the preliminary operation. Here, the threshold value is, for example, a value obtained by statistically calculating an average angular velocity generated by the tilt operation when the user observes the display unit.

In Step S13, the display content is changed from the 7-segment clock display of the second display unit 24 to the display content of the organic EL display of the first display unit 18 in accordance with the tilt operation by the user. In a state in which the organic EL display is displayed as described above, the illuminance sensor 29 detects the illuminance. When the illuminance sensor 29 detects the illuminance, the processing proceeds to Step S14.

In Step S14, the sensor information acquisition unit 51 acquires the detected illuminance, and transmits the illuminance information to the preliminary operation detection unit 52. The preliminary operation detection unit 52 determines whether or not the amount of change (the amount of reduction) in illuminance is equal to or greater than a predetermined value. The amount of change in illuminance in the present embodiment is, for example, an amount of reduction in illuminance. In a case where the amount of change in illuminance is less than the predetermined value, the processing returns to Step S13. On the contrary, in a case where the amount of change in illuminance is equal to or greater than the predetermined value, the processing proceeds to Step S15. For example, in a case where the user moves his/her finger close to the touch screen 17 in order to operate the display content of the organic EL display, the incident light onto the illuminance sensor 29 provided in the lower layer of the touch screen 17 is blocked, thereby causing the amount of change in illuminance to become equal to or larger than the predetermined value. Therefore, the preliminary operation detection unit 52 detects the preliminary operation performed by the user in a case where the amount of change in illuminance is equal to or greater than the predetermined value.

Here, the amount of change in illuminance is, for example, a value obtained by statistically calculating a difference between the illuminance when the user touches the touch screen 17 with a finger and the illuminance when the user moves the finger away from the touch screen 17. Further, the time interval for detecting the amount of change is a predetermined time interval derived from the time required for the user to bring the finger closer to the touch screen 17.

In Step S15, the state switching unit 53 activates the touch screen 17. As described above, the processing of Step S15 is performed in a case where the preliminary operation detection unit 52 detects the tilt operation performed by the user via the gyro sensor 28 and detects the approach of the finger to the touch screen 17 via the illuminance sensor 29. In a case where these conditions are satisfied, the preliminary operation detection unit 52 detects the preliminary operation for the user to perform the touch operation on the touch screen 17.

In Step S16, when the state switching unit 53 activates the touch screen 17, the detection interval control unit 54 relatively shortens the detection interval of the touch screen 17 as compared with the detection interval of the touch screen 17 in the inactive state.

In Step S17, the illuminance sensor 29 detects the illuminance. When the illuminance sensor 29 detects the illuminance, the processing proceeds to Step S18.

In Step S18, the sensor information acquisition unit 51 acquires the detected illuminance, and transmits the illuminance information to the preliminary operation detection unit 52. The preliminary operation detection unit 52 determines whether or not the illuminance is equal to or greater than a threshold value. In a case where the illuminance is less than the threshold, it is estimated that the user is still operating the touch screen 17. Therefore, the processing returns to Step S16, and the detection interval control unit 54 sustains the detection interval in the current active state. On the contrary, in Step S18, in a case where the preliminary operation detection unit 52 determines that the illuminance is equal to or greater than the threshold value, it is estimated that it is highly likely that the user is not operating the touch screen 17. Therefore, the processing proceeds to Step S19, and the state switching unit 53 switches the state of the touch screen 17 from the active state to the inactive state. In a case where the state switching unit 53 deactivates the touch screen 17, the detection interval control unit 54 relatively lengthens the detection interval as compared with the detection interval of the touch screen 17 in the active state.

In Step S19, in a case where the state of the touch screen 17 is switched to the inactive state, the processing proceeds to Step S20. In Step S20, it is determined whether or not an end condition is satisfied. The end condition is, for example, turning off of the power of the electronic apparatus 1. In a case where the end condition is satisfied, the detection interval control processing ends; on the contrary, in a case where the end condition is not satisfied, the processing returns to Step S11.

As described above, in a case where the preliminary operation detection unit 52 detects an operation different from the touch operation, such as the tilt operation or the approach of a finger to the illuminance sensor, the touch screen 17 becomes the active state. In other words, in a case where the electronic apparatus 1 detects the preliminary operation for the user to operate the touch screen 17, the touch screen 17 becomes the active state without any other operation such as special touch operation or pressing of a physical button. Therefore, it is possible for the user to immediately start the touch operation. This makes it possible to provide an electronic apparatus that does not require time to detect a touch operation, according to the present embodiment.

The electronic apparatus 1 including the touch screen 17 configured as described above includes the first sensor and the state switching unit 53. The illuminance sensor 29 detects the approach of the finger to the touch screen 17. In a case where the approach of the finger to the touch screen 17 is detected by the illuminance sensor 29 in the inactive state of the touch screen 17, the state switching unit 53 switches the state of the touch screen 17 from the inactive state to the active state. This makes it possible to provide an electronic apparatus that does not require time to detect a touch operation.

The first sensor includes the illuminance sensor 29 disposed on the rear face side of the touch screen 17, and detects the approach of the finger to the touch screen 17 on the basis of the illuminance detected by the illuminance sensor 29. In this manner, the electronic apparatus 1 detects the approach of the finger to the touch screen 17 on the basis of the illuminance in the inactive state. This makes it possible to provide an electronic apparatus that does not require time to detect a touch operation.

In a case where the approach of the finger to the touch screen 17 is detected on the basis of the illuminance detected by the illuminance sensor 29 in the inactive state of the touch screen 17, the state switching unit 53 controls to switch the operating state of the touch screen 17 from the inactive state to the active state. As described, in the inactive state, the electronic apparatus 1 detects the approach of the finger to the touch screen 17 on the basis of the illuminance. This makes it possible to provide an electronic apparatus that does not require time to detect a touch operation.

In a case where the amount of reduction in illuminance per predetermined time detected by the illuminance sensor 29 is equal to or greater than the threshold value in the inactive state of the touch screen 17, the state switching unit 53 controls to switch the operating state of the touch screen 17 from the inactive state to the active state. In this manner, the electronic apparatus 1 switches the operating state of the touch screen on the basis of the amount of reduction in illuminance in the inactive state. This makes it possible for the user to immediately start the touch operation.

In a case where a value of the illuminance detected by the illuminance sensor 29 is less than a predetermined value in the inactive state of the touch screen 17, the state switching unit 53 controls to switch the operating state of the touch screen 17 from the inactive state to the active state. As described, in a case where the illuminance is lower than the predetermined value in the inactive state, the electronic apparatus 1 switches the operating state of the touch screen. This makes it possible to provide an electronic apparatus that does not require time to detect a touch operation.

The electronic apparatus 1 includes a second detection means having the gyro sensor 28. The second detection means detects a movement of the electronic apparatus 1 as an operation different from the touch operation on the touch screen 17 on the basis of the angular velocity detected by the gyro sensor 28. In this manner, it is possible for the electronic apparatus 1 to detect the movement on the basis of the value of the angular velocity.

In a case where the movement of the electronic apparatus 1 is detected as the operation different from the touch operation on the touch screen 17 on the basis of the angular velocity detected by the gyro sensor 28 in the inactive state of the touch screen 17, the state switching unit 53 controls the state of the touch screen 17 to switch from the inactive state to the active state. In this manner, the electronic apparatus 1 switches the operating state of the touch screen on the basis of the angular velocity in the inactive state. This makes it possible to provide an electronic apparatus that does not require time to detect a touch operation.

In a case where the approach of the finger to the touch screen 17 is detected on the basis of the illuminance detected by the illuminance sensor 29 and the movement of the electronic apparatus 1 is detected as the operation different from the touch operation on the touch screen 17 on the basis of the angular velocity detected by the gyro sensor 28 in the inactive state of the touch screen 17, the state switching unit 53 controls the touch screen 17 to switch from the inactive state to the active state. In this manner, the electronic apparatus 1 switches the operating state of the touch screen 17 on the basis of the angular velocity and the illuminance in the inactive state. This makes it possible to provide an electronic apparatus that allows for the switching of the operating state with higher precision and does not require time to detect a touch operation.

In a case where the movement of the electronic apparatus 1 is detected as the operation different from the touch operation on the touch screen 17 on the basis of the angular velocity detected by the gyro sensor 28 in the inactive state of the touch screen 17, the illuminance sensor 29 detects the illuminance. In this manner, the electronic apparatus 1 switches the operating state of the touch screen 17 by detecting the illuminance on the basis of the detection result of the angular velocity. This makes it possible to provide an electronic apparatus that allows for the switching of the operating state with higher precision and does not require time to detect a touch operation.

The inactive state of the electronic apparatus 1 may include a standby state of the touch screen. In this manner, the electronic apparatus 1 is able to switch the operating state of the touch screen 17 in the inactive state and in the standby state. This makes it possible to provide an electronic apparatus that does not require time to detect a touch operation.

The detection interval control unit 54 makes the detection interval of the touch screen 17 in the active state of the touch screen 17 shorter than the detection interval of the touch screen 17 in the inactive state of the touch screen 17. As described, in a case where the preliminary operation of the touch operation by the user is detected by the preliminary operation detection unit 52, the electronic apparatus 1 relatively shortens the detection interval of the touch screen 17. Shortening the detection interval makes it possible for the electronic apparatus 1 to detect the contact of the user's finger with higher precision. This makes it possible to provide an electronic apparatus that does not require time to detect a touch operation.

MODIFICATION EXAMPLES

An embodiment is not limited to the above-described embodiment, and variations, improvements, or the like within the scope of achieving the objects of an embodiment are included in an embodiment. For example, the embodiment described above may be modified as in the following modified examples. Hereinafter, description is given of modification examples.

First Modification Example

In the above-described embodiment, in a case where the preliminary operation detection unit 52 detects an angular velocity equal to or greater than a threshold value (Step S12) and detects the amount of change in illuminance equal to or greater than a predetermined value (Step S14), the state switching unit 53 switches the state of the touch screen 17 to the active state; however, the state switching unit 53 may switch the state under different conditions. As a modification example, the state of the touch screen 17 may be switched on the basis of an absolute value of the illuminance detected by the illuminance sensor 29. In other words, the processing is the same in that the illuminance is detected in Step S13 after the angular velocity equal to or higher than the threshold value is detected in Step S12. However, the processing is different in that the ground for determining the illuminance performed in Step S14 is not the "amount of change" in illuminance but the "absolute value" of the illuminance.

In the present modification example, in a case where the absolute value of the illuminance is less than a predetermined value, the processing proceeds to Step S15, and the touch screen 17 is switched to the active state. In other words, in a case where the preliminary operation detection unit 52 detects an angular velocity equal to or higher than the threshold value (Step S12) and detects illuminance less than the predetermined value (the modification example of Step S14), the state switching unit 53 switches the state of the touch screen 17 to the active state.

In the electronic apparatus 1 of the present modification example, a visual recognition operation by a user is detected mainly by the gyro sensor 28, and a detected value by the illuminance sensor 29 is used for assisting the detection. In other words, an output value of the gyro sensor 28 corresponding to the movement of an arm of the user exceeds a threshold value, thereby detecting the visual recognition operation by the user. At this time, if the detected value by the illuminance sensor 29 is low, it is estimated that the finger of the user is approaching the touch screen 17. Accordingly, the electronic apparatus 1 determines that the user is about to operate the touch screen 17, and performs control to switch the state of the touch screen 17 to the active state. This configuration eliminates the need for the user to perform an additional operation in order to cause the touch screen 17 to switch to the active state before the user operates the touch screen 17. Therefore, according to the present modification example, it is possible to provide an electronic apparatus that does not require time to detect a touch operation.

Second Modification Example

As another modification example, in the above-described embodiment, the preliminary operation detection unit 52 detects the preliminary operation of the touch operation by the user on the basis of the angular velocity and the illuminance; however, this is non-limiting. In other words, the preliminary operation detection unit 52 may detect the preliminary operation on the basis of only one of the values of the angular velocity and the illuminance. In a case where only the angular velocity is used for the detection of the preliminary operation, the processing of Steps S13 and S14 is omitted. Further, in a case where only the illuminance is used for the detection of the preliminary operation, the processing of Steps S11 and S12 is omitted.

In the case where only the angular velocity is used for the detection of the preliminary operation, if an output value of the gyro sensor 28 corresponding to the movement of the arm of the user exceeds a threshold value, it is estimated in the electronic apparatus 1 that the preliminary operation of moving an arm for the user to perform the touch operation has been performed. At this time, the state of the touch screen 17 is switched to the active state. On the contrary, when only the illuminance is used for the detection of the preliminary operation, if the output value of the illuminance sensor 29 corresponding to the approach of the finger of the user to the touch screen 17 is less than the threshold value, it is estimated in the electronic apparatus 1 that the preliminary operation of the approach of the finger of the user to the touch screen 17 has been performed. At this time, the state of the touch screen 17 is switched to the active state. It is to be noted that the illuminance in the present modification example may be, for example, the absolute value of the illuminance or the amount of change in illuminance. According to the present modification example, a similar effect as that of the above-described embodiment is obtained. Thus, according to the present modification example, it is possible to provide an electronic apparatus that does not require time to detect a touch operation.

Third Modification Example

In Step S13 in the above-described embodiment, the display unit is changed from the 7-segment clock display of the second display unit 24 to the display of the organic EL display of the first display unit 18 in accordance with the tilt operation by the user; however, this is non-limiting. In other words, as another modification example, the processing of Steps S11 and S12 in the above-described embodiment may be omitted, and when the illuminance sensor 29 detects the illuminance in Step S13, the second display unit 24 may be in a state of performing the 7-segment clock display. At this time, it is possible for the illuminance sensor 29 to detect the illuminance even in a state of being blocked by the segment display. Therefore, the processing of Steps S13 and S14 and Step S17 are performed in the similar manner as in the above-described embodiment.

In this case, in Step S13, in a case where the amount of change in illuminance is equal to or greater than a predetermined value, the preliminary operation detection unit 52 detects the preliminary operation. In a case where the preliminary operation is detected, the detection interval of the touch screen 17 is controlled to be relatively short by the similar processing as in the above-described embodiment. For example, the present modification example is also applied to the case where the user changes display from the 7-segment clock display of the second display unit 24 to the display of the organic EL display of the first display unit 18 by pressing the physical button instead of performing the tilt operation. In this case, since the touch screen 17 is in the active state in advance during the 7-segment clock display, when the display is changed to the organic EL display, it is possible for the user to immediately perform the touch operation. In other words, according to the present modification example, it is possible to provide an electronic apparatus that does not require time to detect a touch operation.

Fourth Modification Example

In the embodiment described above, the detection interval control unit 54 relatively shortens the detection interval of the touch screen 17 in Step S16 after the preliminary operation detection unit 52 detects the preliminary operation; however, the following control may be additionally performed. As another modification example, in a case where the state is switched to the inactive state in Step S19, the detection interval control unit 54 may perform control not only to relatively lengthen the detection interval but also to become the standby state in which the detection of the touch operation performed by the user is not performed. According to the present modification example, it is possible to provide an electronic apparatus that does not require time to detect a touch operation, and to realize the touch screen 17 that consumes less electric power in the inactive state and in the standby state.

Fifth Modification Example

As another modification example, the preliminary operation detection unit 52 detects the preliminary operation of the touch operation by the user on the basis of the angular velocity and the illuminance in the above-described embodiment; however, this is non-limiting. For example, the illuminance sensor 29 may be sustained in an OFF state in which the detection of illuminance is not performed in the inactive state, and in a case where an output value of the gyro sensor 28 exceeds a threshold value, the illuminance sensor 29 may be switched to an ON state in which the detection of illuminance is performed. Thereafter, in a case where the absolute value of the illuminance acquired by the illuminance sensor 29 in the ON state is less than a predetermined value, or in a case where the amount of reduction in illuminance is equal to or more than the predetermined value, the touch screen 17 is switched to the active state. This makes it possible to provide an electronic apparatus that does not require time to detect a touch operation. Moreover, since the electronic apparatus 1 is able to sustain the illuminance sensor 29 in the OFF state in the inactive state, power saving is realized.

Sixth Modification Example

As another modification, the electronic apparatus 1 of the fifth modification example detects the illuminance after the detection of the angular velocity, thereby detecting the preliminary operation of the touch operation by the user; however, this is not-limiting.
For example, the electronic apparatus 1 may detect the angular velocity after the detection of the illuminance. In this case, it is possible to cause the gyro sensor 28 to switch to the OFF state in the inactive state. Alternatively, the electronic apparatus 1 may perform processing of detecting the angular velocity and the illuminance in parallel. The threshold values of the angular velocity and the illuminance for detecting the preliminary operation may be the same as those of the above-described embodiment.

It is to be noted that, in all the embodiments described above, the first detection unit includes the illuminance sensor 29; however, any other sensor may be provided as long as it is a sensor that detects light. Similarly, the second detection unit includes the gyro sensor 28; however, any other sensor may be provided as long as it is a sensor that detects the movement of the user.

In the above-described embodiments, explanations are given with the example of the information processing apparatus 1 to which an embodiment is applied being a smart watch; however, an embodiment is not limited thereto in particular. For example, an embodiment is applicable to any electronic device in general having a function of the detection interval control processing. More specifically, for example, an embodiment is applicable to a laptop personal computer, a printer, a video camera, a portable navigation device, a cell phone device, a smartphone, a portable gaming device, and the like.

The processing sequence described above can be executed by hardware, and can also be executed by software. In other words, the functional configuration of FIG. 4 is merely an illustrative example, and an embodiment is not particularly limited thereto. More specifically, the types of functional blocks employed to realize the above-described functions are not particularly limited to the examples shown in FIG. 4, so long as the electronic device 1 can be provided with the functions enabling the aforementioned processing sequence to be executed in its entirety. For example, the state switching unit 53 and the detection interval control unit 54 may be configured as one controller. A single functional block may be configured by a single piece of hardware, a single installation of software, or a combination thereof. The functional configurations of the present embodiment are realized by a processor executing arithmetic processing, and processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific Integrated Circuit) or FPGA (Field-Programmable Gate Array).

In the case of having the series of processing executed by software, the program constituting this software is installed from a network or recording medium to a computer or the like. The computer may be a computer equipped with dedicated hardware. In addition, the computer may be a computer capable of executing various functions, e.g., a general purpose personal computer, by installing various programs.

The storage medium containing such a program can not only be constituted by the removable medium 41 of FIG. 2 distributed separately from the device main body for supplying the program to a user, but also can be constituted by a storage medium or the like supplied to the user in a state incorporated in the device main body in advance. The removable medium 41 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, the ROM 12 of FIG. 4 in which the program is recorded or a hard disk included in the storage section 20 of FIG. 4 or 5, etc.

It should be noted that, in the present specification, the steps defining the program recorded in the storage medium include not only the processing executed in a time series following this order, but also processing executed in parallel or individually, which is not necessarily executed in a time series. Further, in the present specification, the terminology of the system means an entire apparatus including a plurality of apparatuses and a plurality of units.

The embodiments of an embodiment described above are only illustrative, and are not to limit the technical scope of an embodiment. An embodiment can assume various other embodiments. Additionally, it is possible to make various modifications thereto such as omissions or replacements within a scope not departing from the spirit of an embodiment. These embodiments or modifications thereof are within the scope and the spirit of the invention described in the present specification, and within the scope of the invention recited in the claims and equivalents thereof.

What is claimed is:

1. An electronic apparatus provided with a touch screen, the electronic apparatus comprising:
   a first sensor that detects approach of a finger to the touch screen;
   a controller that switches, in an inactive state of the touch screen, in a case where the first sensor detects the approach of the finger to the touch screen, an operating state of the touch screen from the inactive state to an active state; and
   a second sensor provided with an angular velocity sensor, wherein the second sensor detects, on a basis of an angular velocity detected by the angular velocity sensor, a movement of the electronic apparatus as a different operation from a touch operation on the touch screen;
   wherein, in a case where, in the inactive state of the touch screen, the movement of the electronic apparatus as the different operation from the touch operation on the touch screen is detected on the basis of the angular velocity detected by the angular velocity sensor, the controller controls to switch the operating state of the touch screen from the inactive state to the active state;
   wherein, in a case where, in the inactive state of the touch screen, the approach of the finger to the touch screen is detected on a basis of illuminance detected by an illuminance sensor and the movement of the electronic apparatus as the different operation from the touch operation on the touch screen is detected on the basis of the angular velocity detected by the angular velocity sensor, the controller controls to switch the operating state of the touch screen from the inactive state to the active state.

2. The electronic apparatus according to claim 1, wherein the first sensor includes the illuminance sensor disposed on a rear face side of the touch screen, and detects the approach of the finger to the touch screen on a basis of illuminance detected by the illuminance sensor.

3. The electronic apparatus according to claim 2, wherein, in a case where, in the inactive state of the touch screen, the approach of the finger to the touch screen is detected on the basis of the illuminance detected by the illuminance sensor, the controller controls to switch the operating state of the touch screen from the inactive state to the active state.

4. The electronic apparatus according to claim 3, wherein, in a case where, in the inactive state of the touch screen, an amount of reduction in illuminance per predetermined time detected by the illuminance sensor is equal to or greater than a threshold value, the controller controls to switch the operating state of the touch screen from the inactive state to the active state.

5. The electronic apparatus according to claim 3, wherein, in a case where, in the inactive state of the touch screen, a value of the illuminance detected by the illuminance sensor is less than a predetermined value, the controller controls to switch the operating state of the touch screen from the inactive state to the active state.

6. The electronic apparatus according to claim 1, wherein, in a case where, in the inactive state of the touch screen, the movement of the electronic apparatus as the different operation from the touch operation on the touch screen is detected on the basis of the angular velocity detected by the angular velocity sensor, the illuminance sensor detects the illuminance.

7. The electronic apparatus according to claim 1, wherein the inactive state of the touch screen comprises a standby state of the touch screen.

8. The electronic apparatus according to claim 1, wherein the controller makes a detection interval of the touch screen in the active state of the touch screen to be shorter than a detection interval of the touch screen in the inactive state of the touch screen.

9. The electronic apparatus according to claim 1, wherein the first sensor that detects approach of the finger to the touch screen until the finger touched the touch screen.

10. A control method executed by a computer provided with a touch screen, the method comprising:
    a first detecting step of detecting approach of a finger to the touch screen; and
    a control step of switching, in an inactive state of the touch screen, in a case where the approach of the finger to the touch screen is detected, an operating state of the touch screen from the inactive state to an active state;
    a second detecting step of detecting an angular velocity sensor of a movement of the electronic apparatus as a different operation from a touch operation on the touch screen;
    a control step of switching, in the inactive state of the touch screen, in a case where the movement of the electronic apparatus as the different operation from the touch operation on the touch screen is detected on the basis of the angular velocity detected, the operating state of the touch screen from the inactive state to the active state;
    a control step of switching, in the inactive state of the touch screen, in a case where the approach of the finger to the touch screen is detected on a basis of illuminance detected and the movement of the electronic apparatus as the different operation from the touch operation on the touch screen is detected on the basis of the angular velocity detected, the operating state of the touch screen from the inactive state to the active state.

11. A non-transitory computer-readable storage medium storing a program that is executed by a computer provided with a touch screen, the program being executable to cause the computer to perform as functions comprising:
    a first detecting function of detecting approach of a finger to the touch screen; and
    a control function of switching, in an inactive state of the touch screen, in a case where the approach of the finger to the touch screen is detected, an operating state of the touch screen from the inactive state to an active state;

a second detecting function of detecting an angular velocity sensor of a movement of the electronic apparatus as a different operation from a touch operation on the touch screen;

a control function of switching, in the inactive state of the touch screen, in a case where the movement of the electronic apparatus as the different operation from the touch operation on the touch screen is detected on the basis of the angular velocity detected, the operating state of the touch screen from the inactive state to the active state;

a control function of switching, in the inactive state of the touch screen, in a case where the approach of the finger to the touch screen is detected on a basis of illuminance detected and the movement of the electronic apparatus as the different operation from the touch operation on the touch screen is detected on the basis of the angular velocity detected, the operating state of the touch screen from the inactive state to the active state.

* * * * *